US012012120B2

(12) United States Patent
Suissa et al.

(10) Patent No.: US 12,012,120 B2
(45) Date of Patent: Jun. 18, 2024

(54) SYSTEM FOR TUNING A TRAJECTORY TRACKING CONTROLLER FOR AN AUTOMOTIVE VEHICLE

(71) Applicant: GM GLOBAL TECHNOLOGY OPERATIONS LLC, Detroit, MI (US)

(72) Inventors: Avshalom Suissa, Ganei Tikva (IL); Vladimir Suplin, Modiin (IL)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 17/874,451

(22) Filed: Jul. 27, 2022

(65) Prior Publication Data

US 2024/0034349 A1 Feb. 1, 2024

(51) Int. Cl.
*B60W 60/00* (2020.01)
*B60W 30/14* (2006.01)
*B60W 50/00* (2006.01)
*G06N 3/08* (2023.01)

(52) U.S. Cl.
CPC ........ *B60W 60/001* (2020.02); *B60W 30/143* (2013.01); *B60W 50/0097* (2013.01); *G06N 3/08* (2013.01); *B60W 2050/0022* (2013.01); *B60W 2050/0028* (2013.01)

(58) Field of Classification Search
CPC ............. B60W 60/001; B60W 30/143; B60W 50/0097; B60W 2050/0022; B60W 2050/0028; G06N 3/08; G06N 3/045
See application file for complete search history.

(56) References Cited

U.S. PATENT DOCUMENTS

2022/0114888 A1* 4/2022 Napanda .............. G08G 1/0112

* cited by examiner

*Primary Examiner* — Yuen Wong
(74) *Attorney, Agent, or Firm* — Quinn IP Law (57) ABSTRACT

A system for tuning a trajectory tracking controller for a vehicle includes a trajectory planner configured to generate the planned trajectory and to output one or more planned trajectory components representative of the planned trajectory, a model predictive controller including an internal model and an optimizer, and a tuning neural network configured to receive the one or more planned trajectory components and one or more measured trajectory components and to produce weights for a cost function. The internal model is configured to receive a predicted control input from the optimizer and the one or more measured trajectory components and to produce a predicted output. The optimizer utilizes a cost function and is configured to receive the weights for the cost function and a predicted error and to produce the predicted control input, wherein the predicted error is a selected one of the planned trajectory components minus the predicted output.

20 Claims, 3 Drawing Sheets

SYSTEM FOR TUNING A TRAJECTORY TRACKING CONTROLLER FOR AN AUTOMOTIVE VEHICLE

INTRODUCTION

This disclosure relates generally to systems for tuning a trajectory tracking controller for an automotive vehicle, and more specifically to such systems which utilize model predictive control.

In the field of self-driving or assisted-driving vehicles, a model predictive controller (MPC) or other control system may be used to track a suggested route for the vehicle. With the aid of various sensors carried on-board the vehicle, the control system may attempt to cause the vehicle to follow the suggested route by executing an ongoing set of commands to the throttle, brakes and steering system, based on such factors as the destination that has been identified, the detected presence, speed and trajectory of other vehicles, etc. The system may receive ongoing feedback about the vehicle's position, speed and heading, as well as about the position, speed and heading of neighboring and oncoming vehicles, so as to make adjustments and updates to the suggested route and to the commands sent to the throttle, brakes and steering system.

SUMMARY

According to one embodiment, a system for tuning a trajectory tracking controller for an automotive vehicle includes a trajectory planner, an MPC and a tuning neural network. The trajectory planner is configured to generate a planned trajectory and to output one or more planned trajectory components representative of the planned trajectory. The MPC includes an internal model of the automotive vehicle and an optimizer. The internal model is configured to receive a predicted control input from the optimizer and one or more measured trajectory components from the automotive vehicle, and is also configured to produce a predicted output. The optimizer utilizes a cost function and is configured to receive a plurality of weights for the cost function and a predicted error and to produce the predicted control input, wherein the predicted error is a sum of a selected one of the planned trajectory components minus the predicted output. The tuning neural network is configured to receive the one or more planned trajectory components and the one or more measured trajectory components, and to produce the weights for the cost function.

In this embodiment, the predicted control input produced by the optimizer may be one or more of a steering command, a throttle command and a brake command for the automotive vehicle, and the weights for the cost function may be represented by a weights matrix produced by the tuning neural network. The automotive vehicle may have a current position and a current speed at a current time, and the trajectory planner may generate a planned next position and a planned next speed for the automotive vehicle for a next time which is a predetermined time step after the current time. In this arrangement, the one or more planned trajectory components include one or more of a forward component of the planned next position, a lateral component of the planned next position, and a magnitude of the planned next speed.

The system may further include a critic neural network configured to receive the one or more planned trajectory components and the one or more measured trajectory components, wherein the tuning neural network and the critic neural network cooperate with each other to tune the weights utilizing a reinforcement learning optimization algorithm seeking to minimize the cost function.

The reinforcement learning optimization algorithm may be one of a Proximal Policy Optimization algorithm, a Soft Actor-Critic algorithm, a Deep Deterministic Policy Gradient algorithm, and a Twin-Delayed Deep Deterministic Policy Gradient algorithm. The tuning neural network and the critic neural network may cooperate with each other to tune the weights during a training phase. The system may further include a multi-dimensional look-up table of stored weights operatively connected with the optimizer. The MPC may retrieve the stored weights from the multi-dimensional look-up table during a deployment phase of normal operation of the automotive vehicle.

According to another embodiment, a system for tuning a trajectory tracking controller for an automotive vehicle includes: (i) a trajectory planner configured to generate a planned trajectory and to output one or more planned trajectory components representative of the planned trajectory; (ii) an MPC including an internal model of the automotive vehicle and an optimizer, wherein the internal model is configured to receive a predicted control input from the optimizer and one or more measured trajectory components from the automotive vehicle and to produce a predicted output, and wherein the optimizer utilizes a cost function and is configured to receive a plurality of weights for the cost function and a predicted error and to produce the predicted control input, wherein the predicted error is a sum of a selected one of the planned trajectory components minus the predicted output; (iii) a tuning neural network configured to receive the one or more planned trajectory components and the one or more measured trajectory components and to produce the weights for the cost function; and (iv) a critic neural network configured to receive the one or more planned trajectory components and the one or more measured trajectory components. The tuning neural network and the critic neural network cooperate with each other to tune the weights utilizing a reinforcement learning optimization algorithm seeking to minimize the cost function.

In this embodiment, the predicted control input produced by the optimizer may be one or more of a steering command, a throttle command and a brake command for the automotive vehicle, and the weights for the cost function may be represented by a weights matrix produced by the tuning neural network. The automotive vehicle may have a current position and a current speed at a current time, and the trajectory planner may generate a planned next position and a planned next speed for the automotive vehicle for a next time which is a predetermined time step after the current time. In this arrangement, the one or more planned trajectory components include one or more of a forward component of the planned next position, a lateral component of the planned next position, and a magnitude of the planned next speed.

The reinforcement learning optimization algorithm may be one of a Proximal Policy Optimization algorithm, a Soft Actor-Critic algorithm, a Deep Deterministic Policy Gradient algorithm, and a Twin-Delayed Deep Deterministic Policy Gradient algorithm. The tuning neural network and the critic neural network may cooperate with each other to tune the weights during a training phase. The system may further include a multi-dimensional look-up table of stored weights operatively connected with the optimizer. The MPC may retrieve the stored weights from the multi-dimensional look-up table during a deployment phase of normal operation of the automotive vehicle.

According to yet another embodiment, a trajectory tracking and tuning system for an automotive vehicle includes a trajectory planner, an MPC, a tuning neural network and a critic neural network. The trajectory planner is configured to generate a planned trajectory for the automotive vehicle and to output one or more planned trajectory components representative of the planned trajectory. The MPC includes an internal model of the automotive vehicle and an optimizer. The internal model is configured to receive a predicted control input from the optimizer and one or more measured trajectory components from the automotive vehicle, and to produce a predicted output. The optimizer utilizes a cost function and is configured to receive a plurality of weights for the cost function and a predicted error, and to produce the predicted control input. The predicted error is a sum of a selected one of the planned trajectory components minus the predicted output, and the predicted control input produced by the optimizer is one or more of a steering command, a throttle command and a brake command for the automotive vehicle.

The tuning neural network is configured to receive the one or more planned trajectory components and the one or more measured trajectory components, and to produce the weights for the cost function. The critic neural network is configured to receive the one or more planned trajectory components and the one or more measured trajectory components. The tuning neural network and the critic neural network cooperate with each other to tune the weights utilizing a reinforcement learning optimization algorithm seeking to minimize the cost function.

In this embodiment, the automotive vehicle may have a current position and a current speed at a current time, and the trajectory planner may generate a planned next position and a planned next speed for the automotive vehicle for a next time which is a predetermined time step after the current time. In this arrangement, the one or more planned trajectory components include one or more of a forward component of the planned next position, a lateral component of the planned next position, and a magnitude of the planned next speed. The trajectory tracking and tuning system may further include a multi-dimensional look-up table of stored weights operatively connected with the optimizer, wherein the MPC retrieves the stored weights from the multi-dimensional look-up table during a deployment phase of normal operation of the automotive vehicle.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Referring now to the drawings, wherein like numerals indicate like parts in the several views, a system 20 for tuning a trajectory tracking controller 32 for an automotive vehicle 24 is shown and described herein.

The position, speed and heading of the vehicle 24 may be described in terms of a spatial coordinate system. In turn, the spatial coordinate system may be defined with respect to a fixed point in space, or it may be defined dynamically with respect to the current direction of the vehicle 24, where the current forward direction of the vehicle may be defined as a positive x-direction, and any leftward or rightward steering of the vehicle may be defined as being in the positive or negative y-directions, respectively.

Figure 1:
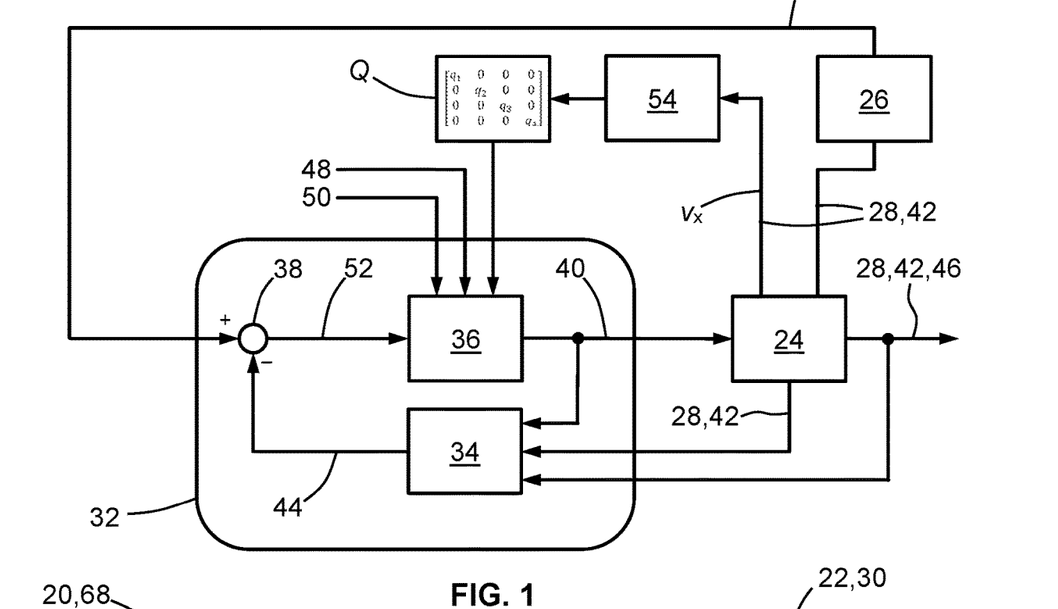
FIG. 1 is a schematic view of an MPC-based system for tuning a planned trajectory tracking controller for an automotive vehicle according to a customary approach.

FIG. 1 shows a schematic view of an MPC-based system for tuning a planned trajectory tracking controller 32 for an automotive vehicle 24 according to a customary approach. This system may include various hardware (e.g., chipsets, sensors, etc.) and software (e.g., code, instruction sets, control logic, etc.) inside the vehicle 24. The system includes a trajectory planner 26 that is configured for receiving various data 28 from the vehicle's sensors/estimators. The data 28 may include the current vehicle velocity in the x-direction $v_x$, the current vehicle velocity in the y-direction $v_y$, the current vehicle acceleration in the x-direction $a_x$, the current vehicle acceleration in the y-direction $a_y$, the current vehicle yaw angle $\psi$, the current rate of change of the vehicle yaw angle $\dot\psi$, as well as other data. The trajectory planner 26 uses this vehicle data 28, along with various rules, constraints and objectives, to generate a planned trajectory 22 in real time, and then outputs one or more planned trajectory components 30 which characterize the planned trajectory 22 for at least the next time step, and optionally for multiple next time steps. For example, the planned trajectory components 30 may include a planned next position ($x_{traj}$, $y_{traj}$) and a planned next speed ($v_{traj}$) for the automotive vehicle 24 for a next time which is a predetermined time step (e.g., 20 milliseconds) after the current time. Alternatively, the planned trajectory components 30 may include multiple planned next positions and multiple planned next speeds.

The one or more planned trajectory components 30 which characterize the planned trajectory 22 are fed into a summer 38, which may be a part of an MPC 32 as shown in the drawings, or which may be separate from the MPC 32 in a flow position between the trajectory planner 26 and the MPC 32. The MPC 32 includes an internal model 34 of the vehicle 24 and an optimizer 36. The internal model 34 may be a set of equations, parameters, constraints, relationships and the like which characterize and describe the behavior and movement of the vehicle 24. The internal model 34 is configured to receive a predicted control input 40 from the optimizer 36 and one or more measured trajectory components 42 from the automotive vehicle 24, and to produce a predicted output 44. The measured trajectory components 42 are one or more spatial components (i.e., the x- and y-components) of the actual current position of the vehicle 24, and may also optionally include one or more spatial components of the speed and acceleration of the vehicle (i.e., $v_x$, $v_y$, $a_x$, $a_y$). Note that the measured trajectory components 42 may also be represented as data 28 from the vehicle's various sensors/estimators. For example, in FIG. 1, the branch flowing from the bottom side of block 24 (representing the vehicle 24) and feeding into the internal model 34 may be an x-component of the measured current vehicle position, while the branch flowing from the right side of block 24 may be the y-component of the measured current vehicle position. In this example, the measured trajectory components 42 or data 28 of each of these two branches may be expressed as a current value or as a function of time, with the branch flowing from the right side of block 24 representing a vehicle command 46 or set of commands, which may be one or more of a steering command, a throttle command and a brake command.

The optimizer 36 utilizes a suitable cost function 48 and may optionally also utilize various physical or performance constraints 50 placed on the vehicle 24 and its behavior/movement. The cost function 48 and constraints 50 may be a part of the optimizer 36 and its hardware/software, or it may be accessed by the optimizer 36, such as from a module, memory or the like that is separate from the optimizer 36. The optimizer 36 is configured to receive a plurality of weights (e.g., $q_1$, $q_2$, $q_3$, $q_4$) for the cost function 48, which may be represented by the diagonal weights matrix Q, and to also receive a predicted error 52 to produce the predicted control input 40. (Note that as used herein, "Q" may be used to represent the weights matrix as well as the collection of individual weights.) As indicated at the summer 38, the predicted error 52 is a sum of a selected one of the planned trajectory components 30 (e.g., $y_{traj}$) from the trajectory planner 26 minus the predicted output 44 from the internal model 34.

Figure 4:
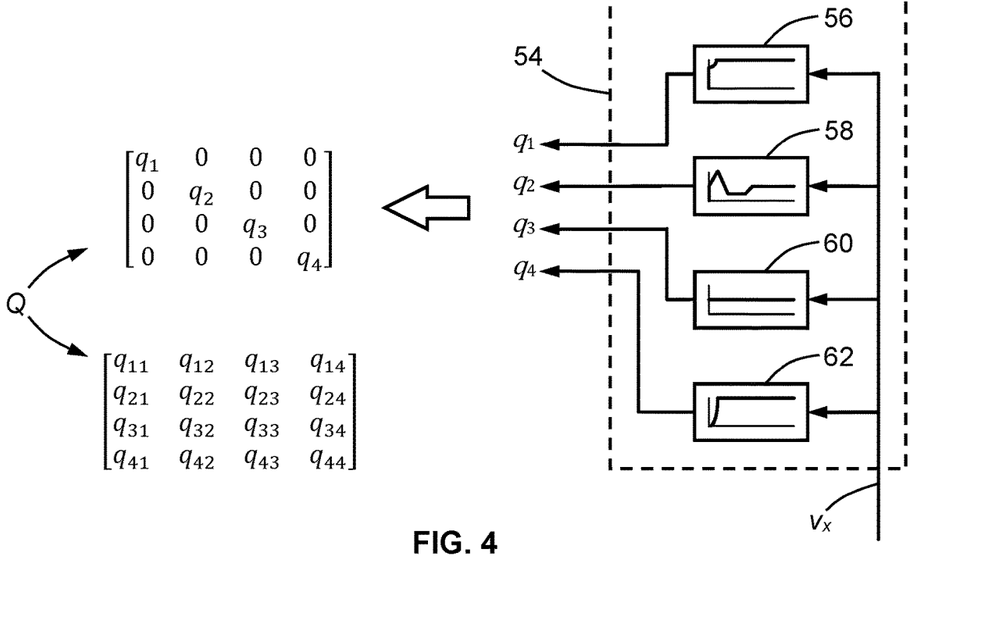
FIG. 4 is a graphic of a diagonal weights matrix, derived from various look-up tables for use in the customary system and approach shown in FIG. 1, compared with a weights matrix according to the present disclosure.

According to the customary approach, the weights (e.g., $q_1$, $q_2$, $q_3$, $q_4$) for the cost function 48, as represented by the diagonal weights matrix Q, may be taken from a look-up table (LUT) 54, which may comprise a set of values stored in a module, a set of memory registers or the like. (Note that the diagonal weights matrix Q, as used here in the customary approach, has non-zero values only along the main diagonal, with all other values in the matrix being zero. While this is usually the case in the customary approach for the sake of simplicity, it should be noted that the off-diagonal values may be non-zero.) As illustrated in FIG. 4, the individual weights or values $q_1$, $q_2$, $q_3$, $q_4$ may be derived from other equations, estimations or LUTs, such as from respective first, second, third and fourth LUTs 56, 58, 60, 62. Each of these LUTs 56, 58, 60, 62 may be a set of values that represent the response of a particular equation or function to a given input, such as the measured forward velocity $v_x$ of the vehicle 24. Alternatively, rather than utilizing a set of LUTs 56, 58, 60, 62 as shown in FIG. 4, the customary approach may instead utilize a single main LUT 54, which provides the set of required weights $q_1$, $q_2$, $q_3$, $q_4$ in response to an expected input (e.g., the measured forward velocity $v_x$). Or, the single main LUT 54 may contain predetermined values for the weights $q_1$, $q_2$, $q_3$, $q_4$ that have been manually entered.

With the measured forward velocity $v_x$ inputted into the main LUT 54 or into the set of individual LUTs 56, 58, 60, 62, the weights $q_1$, $q_2$, $q_3$, $q_4$ for the diagonal weights matrix Q may be determined and stored in a working LUT or set of designated memory registers 53. These weights $q_1$, $q_2$, $q_3$, $q_4$ may then be accessed by or made available to the optimizer 36 for use in the cost function 48. (It should be noted that while four weights $q_1$, $q_2$, $q_3$, $q_4$ and corresponding LUTs 56, 58, 60, 62 have been presented here, this is merely as an example, as any other suitable number of weights and LUTs may be used in the customary approach.) Utilizing these weights Q, the one or more planned trajectory components 30, and the one or more measured trajectory components 42, the MPC-based system 20 of the customary approach may continuously adjust the vehicle command 46 (e.g., steering, throttle and/or brakes) so as to cause the vehicle's actual trajectory to conform with a desired trajectory.

In contrast, the system 20 for tuning a trajectory tracking controller 32 for an automotive vehicle 24 according to the present disclosure does not utilize predetermined values and LUTs for the weights of the cost function 48. Instead, the present system 20 utilizes a tuning neural network 64 to determine the weights of the cost function 48, as may be represented by a weights matrix Q that is not limited to having non-zero values along only the main diagonal of the matrix.

Figure 2:
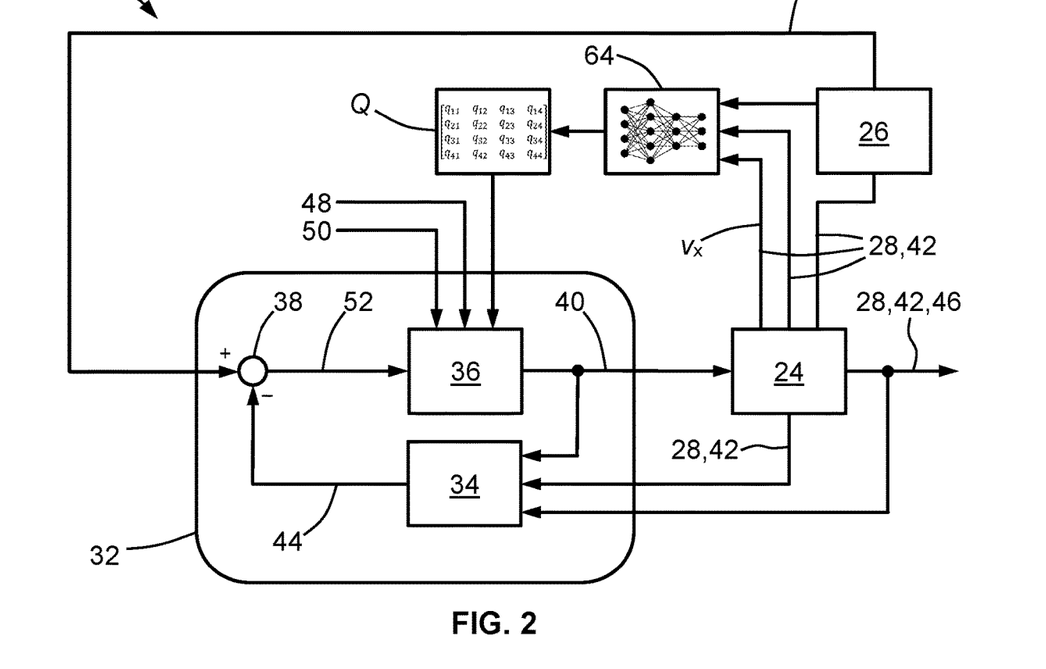
FIG. 2 is a schematic view of an MPC-based system for tuning a planned trajectory tracking controller for an automotive vehicle according to the present disclosure.

FIG. 2 shows a schematic view of one embodiment of the MPC-based system 20 of the present disclosure. The system 20 includes a trajectory planner 26, an MPC 32 and a tuning neural network 64. The trajectory planner 26 is configured to generate the planned trajectory 22 and to output one or more planned trajectory components 30 (e.g., $y_{traj}$, $x_{traj}$, $v_{traj}$) that are representative of the planned trajectory 22. The MPC 32 includes an internal model 34 of the automotive vehicle 24 and an optimizer 36, wherein the internal model 34 is configured to receive a predicted control input 40 from the optimizer 36 and one or more measured trajectory components 42 from the automotive vehicle 24, and to produce a predicted output 44. The optimizer 36 utilizes a cost function 48 (and optionally one or more constraints 50) and is configured to receive a plurality of weights Q for the cost function 48 and a predicted error 52, and to produce the predicted control input 40. As indicated at the summer 38, the predicted error 52 is a sum of a selected one of the planned trajectory components 30 (e.g., $y_{traj}$) minus the predicted output 44.

Figure 3:
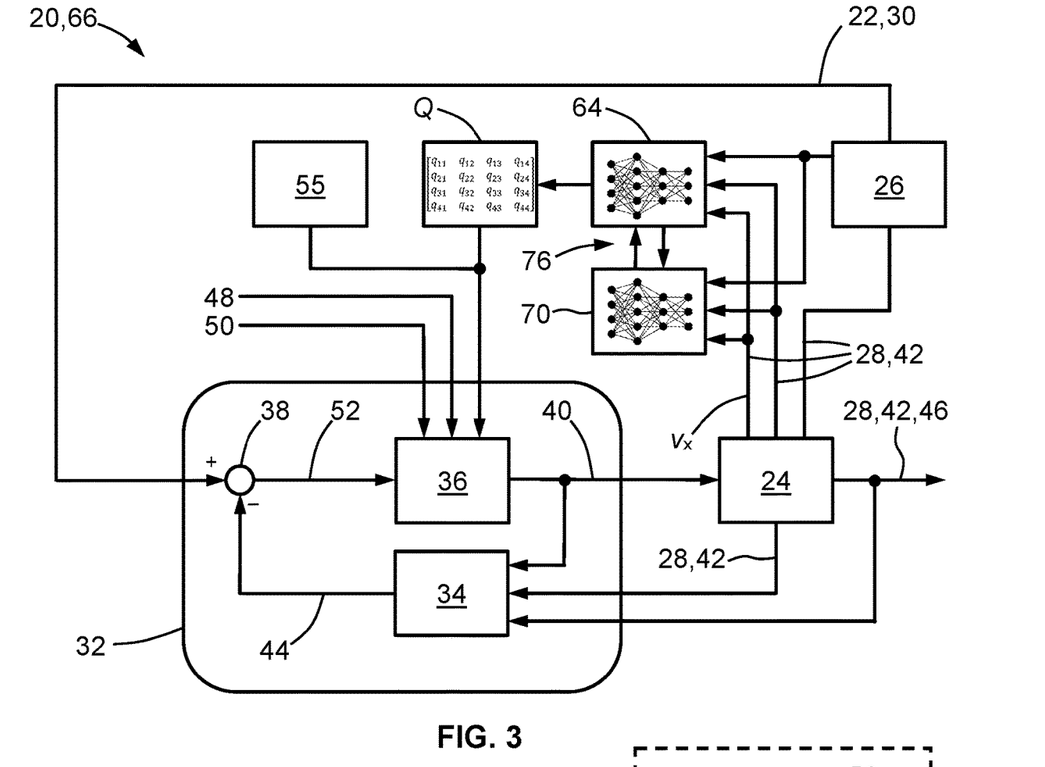
FIG. 3 is a schematic view of the system shown in FIG. 2 in a training phase.

The tuning neural network 64 is configured to receive the one or more planned trajectory components (e.g., $y_{traj}$, $x_{traj}$, $v_{traj}$) and the one or more measured trajectory components 42 (e.g., $v_x$, $a_x$, $a_y$, $\psi$, $\dot{\psi}$), and to produce the weights Q for the cost function 48. The tuning neural network 64 may be any suitable type of neural network having an input layer, an output layer and one or more hidden layers between the input and output layers. The weights matrix Q of FIG. 3 is shown as having four rows and four columns, with each individual weight having two subscripts. Here, the first subscript is the row number of the individual weight, and the second script is the column number of the weight. Note that unlike the weights matrix Q of the customary approach where all values off the main diagonal are usually zero, the weights matrix Q of the present disclosure is illustrated as being a 4×4 matrix where the off-diagonal values are not necessarily zero.

In this embodiment, the predicted control input 40 produced by the optimizer 36 may be a vehicle command 46 or set of commands for the automotive vehicle 24 (such as a steering command, a throttle command and/or a brake command), and the weights for the cost function may be represented by a weights matrix Q produced by the tuning neural network 64. The automotive vehicle 24 may have a current position ($x_0$, $y_0$) and a current speed $v_0$ at a current time $t_0$, and the trajectory planner 26 may generate a planned next position ($x_1$, $y_1$) and a planned next speed $v_1$ for the automotive vehicle 24 for a next time $t_1$ which is a predetermined time step $\Delta t$ after the current time $t_0$. In this arrangement, the one or more planned trajectory components 30 include one or more of a forward component of the planned next position (i.e., $x_1$, or $x_{traj}$), a lateral component of the planned next position (i.e., $y_1$, or $y_{traj}$), and a magnitude of the planned next speed (i.e., $v_1$, or $v_{traj}$).

FIG. 2 illustrates the system 20 being utilized in a normal deployment phase 68, in which the system 20 is installed in a vehicle 24 and the vehicle 24 is ready for being started up and utilized for its intended use as a passenger vehicle, a freight/delivery vehicle, an electrical generator/power source, etc. The system 20 may also be engaged in a training phase 66, as illustrated in FIG. 3. This training phase 66 may be entered into when it is desired to tune the MPC 32. In the training phase 68, the system 20 may include and/or may be operatively engaged with another neural network, referred to as a critic neural network (CNN) 70.

As shown in FIG. 3, the CNN 70 may be configured to receive the one or more planned trajectory components 30 and the one or more measured trajectory components 42 One function of the CNN 70 is to provide an estimation of the tuning neural network 64 performance by predicting (i.e., estimating) how well the tuning neural network 64 will perform at a given state if the current tuning neural network 64 continues to be utilized. The training algorithm uses this estimation to train the tuning neural network 64 to output better weights Q, in order to minimize the cost function 48. The tuning neural network 64 and the CNN 70 cooperate with each other to tune and iterate on the weights Q by utilizing a reinforcement learning optimization algorithm 76 in a manner that seeks to minimize the cost function 48. This cooperation between the tuning neural network 64 and the CNN 70 is graphically represented in FIG. 3 by the two arrows pointing back-and-forth between these two neural networks 64, 70. More specifically, this cooperation is facilitated by the aforementioned reinforcement learning optimization algorithm 76, which is utilized to minimize the cost function 48 to some acceptable degree or extent. Note that reference numeral 76 is used in FIG. 3 to represent this reinforcement learning optimization algorithm 76 being used to facilitate the back-and-forth/iterative cooperation between the tuning neural network 64 and the CNN 70.

Figure 5:
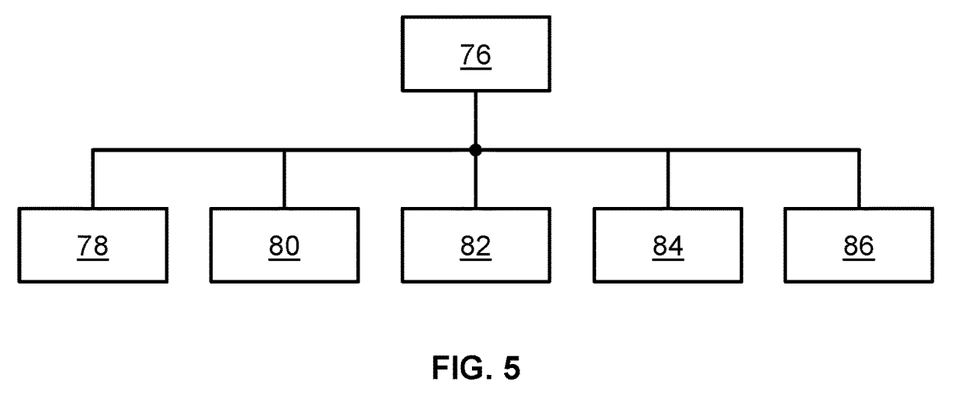
FIG. 5 is a block diagram showing various reinforcement learning optimization algorithms.

FIG. 5 shows a block diagram of various reinforcement learning optimization algorithms 76 which may be used in the present system 20. For example, the reinforcement learning optimization algorithm 76 may be a Proximal Policy Optimization (PPO) algorithm 78, a Soft Actor-Critic (SAC) algorithm 80, a Deep Deterministic Policy Gradient (DDPG) algorithm 82, a Twin-Delayed Deep Deterministic Policy Gradient (TD3) algorithm 84 or another type 86 of reinforcement learning optimization algorithm 76.

The tuning neural network 64 and the CNN 70 may cooperate with each other to tune the weights Q during a training phase 66. The system 20 may further include a multi-dimensional look-up table 55 of stored weights operatively connected with the optimizer 36. The MPC 32 may retrieve the stored weights from the multi-dimensional look-up table 55 during a deployment phase 68 of normal operation of the automotive vehicle 24. These stored weights may represent starting values to use for the weights Q in order to start the tuning process. (Note, however, that the use of a multi-dimensional look-up table 55 is optional.)

According to another embodiment, a system 20 for tuning a trajectory tracking controller 32 for an automotive vehicle 24 includes: (i) a trajectory planner 26 configured to generate a planned trajectory 22 and to output one or more planned trajectory components 30 representative of the planned trajectory 22; (ii) an MPC 32 including an internal model 34 of the automotive vehicle 24 and an optimizer 36, wherein the internal model 34 is configured to receive a predicted control input 40 from the optimizer 36 and one or more measured trajectory components 42 from the automotive vehicle 24 and to produce a predicted output 44, and wherein the optimizer 36 utilizes a cost function 48 and is configured to receive a plurality of weights Q for the cost function 48 and a predicted error 52 and to produce the predicted control input 40, wherein the predicted error 52 is a sum of a selected one of the planned trajectory components 30 minus the predicted output 44; (iii) a tuning neural network 64 configured to receive the one or more planned trajectory components 30 and the one or more measured trajectory components 42 and to produce the weights Q for the cost function 48; and (iv) a CNN 70 configured to receive the one or more planned trajectory components 30 and the one or more measured trajectory components 42. The tuning neural network 64 and the CNN 70 cooperate with each other to tune the weights Q utilizing a reinforcement learning optimization algorithm 76 seeking to minimize the cost function 48.

In this embodiment, the predicted control input 40 produced by the optimizer 36 may be a steering, throttle and/or brake command 46 (or a set of such commands) for the automotive vehicle 24, and the weights Q for the cost function 48 may be represented by a weights matrix Q produced by the tuning neural network 64. The automotive vehicle 24 may have a current position $(x_0, y_0)$ and a current speed $v_0$ at a current time to, and the trajectory planner 26 may generate a planned next position $(x_1, y_1)$ or $(x_{traj}, y_{traj})$ and a planned next speed $v_1$ or $v_{traj}$ for the automotive vehicle 24 for a next time $t_1$ which is a predetermined time step $\Delta t$ after the current time to. In this arrangement, the one or more planned trajectory components 30 include one or more of a forward component of the planned next position (i.e., $x_1$, or $x_{traj}$), a lateral component of the planned next position (i.e., $y_1$, or $y_{traj}$), and a magnitude of the planned next speed (i.e., $v_1$, or $v_{traj}$).

The reinforcement learning optimization algorithm 76 may be one of a PPO algorithm 78, an SAC algorithm 80, a DDPG algorithm 82, and a TD3 algorithm 84. The tuning neural network 64 and the CNN 70 may cooperate with each other to tune the weights Q during a training phase 66. The system 20 may further include a multi-dimensional look-up table 55 of stored weights operatively connected with the optimizer 36. The MPC 32 may retrieve the stored weights from the multi-dimensional look-up table 55 during a deployment phase 68 of normal operation of the automotive vehicle 24.

According to yet another embodiment, a trajectory tracking and tuning system 20 for an automotive vehicle 24 includes a trajectory planner 26, an MPC 32, a tuning neural network 64 and a CNN 70. The trajectory planner 26 is configured to generate a planned trajectory 22 for the automotive vehicle 24 and to output one or more planned trajectory components 30 representative of the planned trajectory 22. The MPC 32 includes an internal model 34 of the automotive vehicle 24 and an optimizer 36. The internal model 34 is configured to receive a predicted control input 40 from the optimizer 36 and one or more measured trajectory components 42 from the automotive vehicle 24, and to produce a predicted output 44. The optimizer 36 utilizes a cost function 48 and is configured to receive a plurality of weights Q for the cost function 48 and a predicted error 52, and to produce the predicted control input 40. The predicted error 52 is a sum of a selected one of the planned trajectory components 30 minus the predicted output 44, and the predicted control input 40 produced by the optimizer 36 is a vehicle command 46 for the automotive vehicle 24, which may be one or more of a steering command, a throttle command and a brake command.

The tuning neural network 64 is configured to receive the one or more planned trajectory components 30 and the one or more measured trajectory components 42, and to produce the weights Q for the cost function 48. The CNN 70 is configured to receive the one or more planned trajectory components 30 and the one or more measured trajectory components 42. The tuning neural network 64 and the CNN 70 cooperate with each other to tune the weights Q utilizing a reinforcement learning optimization algorithm 76 seeking to minimize the cost function 48.

In this embodiment, the automotive vehicle 24 may have a current position $(x_0, y_0)$ and a current speed $v_0$ at a current time to, and the trajectory planner 26 may generate a planned next position $(x_1, y_1)$ or $(x_{traj}, y_{traj})$ and a planned next speed $v_1$ or $v_{traj}$ for the automotive vehicle 24 for a next time $t_1$ which is a predetermined time step $\Delta t$ after the current time to. In this arrangement, the one or more planned trajectory components 30 include one or more of a forward component of the planned next position (i.e., $x_1$, or $x_{traj}$), a lateral component of the planned next position (i.e., $y_1$, or $y_{traj}$), and a magnitude of the planned next speed (i.e., $v_1$, or $v_{traj}$). The trajectory tracking and tuning system 20 may further include a multi-dimensional look-up table 55 operatively connected with the optimizer 36, wherein the MPC 32 retrieves the stored weights from the multi-dimensional look-up table 55 during a deployment phase 68 of normal operation of the automotive vehicle 24.

While various functions of the system 20 have been described and illustrated as being separate modules or elements, it may be noted that two or more functions may be combined into fewer modules or elements. Similarly, some functions described as a single module or element may be separated into two or more modules or elements. Additionally, the arrangement of the functions, modules and elements may be rearranged into one or more different arrangements.

As used herein, a "module" may include hardware and/or software, including executable instructions, for receiving one or more inputs, processing the one or more inputs, and providing one or more corresponding outputs. Examples of such modules may include the trajectory planner 26, the MPC 32, the internal model 34, the optimizer 36, the tuning neural network 64, the CNN 70, the weights matrix Q and the vehicle 24. Also note that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A system for an automotive vehicle, comprising:
a trajectory planner, comprising a chipset, configured to generate a planned trajectory and to output one or more planned trajectory components representative of the planned trajectory;
a model predictive controller (MPC), comprising a chipset, configured to:
receive a predicted control input and one or more measured trajectory components from the automotive vehicle,
produce a predicted output,
utilize a cost function to receive a plurality of weights for the cost function and a predicted error to produce the predicted control input,
wherein the predicted error is a sum of a selected one of the planned trajectory components minus the predicted output; and
a tuning neural network, comprising a chipset, configured to receive the one or more planned trajectory components and the one or more measured trajectory components and to produce the plurality of weights for the cost function.

2. The system of claim 1, wherein the predicted control input produced by the MPC is one or more of a steering command, a throttle command and a brake command for the automotive vehicle.

3. The system of claim 1, wherein the plurality of weights for the cost function are represented by a weights matrix produced by the tuning neural network.

4. The system of claim 1, wherein the automotive vehicle has a current position and a current speed at a current time and the trajectory planner generates a planned next position and a planned next speed for the automotive vehicle for a next time which is a predetermined time step after the current time, and wherein the one or more planned trajectory components include one or more of:
a forward component of the planned next position;
a lateral component of the planned next position; and
a magnitude of the planned next speed.

5. The system of claim 1, further comprising:
a critic neural network, comprising a chipset, configured to receive the one or more planned trajectory components and the one or more measured trajectory components;

wherein the tuning neural network and the critic neural network cooperate with each other to tune the plurality of weights utilizing a reinforcement learning optimization algorithm seeking to minimize the cost function.

6. The system of claim 5, wherein the reinforcement learning optimization algorithm is one of:
a Proximal Policy Optimization algorithm;
a Soft Actor-Critic algorithm;
a Deep Deterministic Policy Gradient algorithm; and
a Twin-Delayed Deep Deterministic Policy Gradient algorithm.

7. The system of claim 5, wherein the tuning neural network and the critic neural network cooperate with each other to tune the plurality of weights during a training phase.

8. The system of claim 1, further comprising:
a multi-dimensional look-up table of stored weights operatively connected with the MPC.

9. The system of claim 8, wherein the MPC retrieves the stored weights from the multi-dimensional look-up table during a deployment phase of an operation of the automotive vehicle.

10. A system for an automotive vehicle, comprising:
a trajectory planner, comprising a chipset, configured to generate a planned trajectory and to output one or more planned trajectory components representative of the planned trajectory;
a model predictive controller (MPC), comprising a chipset, configured to:
receive a predicted control input and one or more measured trajectory components from the automotive vehicle,
produce a predicted output,
utilize a cost function to receive a plurality of weights for the cost function and a predicted error to produce the predicted control input,
wherein the predicted error is a sum of a selected one of the planned trajectory components minus the predicted output; and
a tuning neural network, comprising a chipset, configured to receive the one or more planned trajectory components and the one or more measured trajectory components and to produce the plurality of weights for the cost function; and
a critic neural network, comprising a chipset, configured to receive the one or more planned trajectory components and the one or more measured trajectory components,
wherein the tuning neural network and the critic neural network cooperate with each other to tune the plurality of weights utilizing a reinforcement learning optimization algorithm seeking to minimize the cost function.

11. The system of claim 10, wherein the predicted control input produced by the MPC is one or more of a steering command, a throttle command and a brake command for the automotive vehicle.

12. The system of claim 10, wherein the plurality of weights for the cost function are represented by a weights matrix produced by the tuning neural network.

13. The system of claim 10, wherein the automotive vehicle has a current position and a current speed at a current time and the trajectory planner generates a planned next position and a planned next speed for the automotive vehicle for a next time which is a predetermined time step after the current time, and wherein the one or more planned trajectory components include one or more of:
a forward component of the planned next position;
a lateral component of the planned next position; and
a magnitude of the planned next speed.

14. The system of claim 10, wherein the reinforcement learning optimization algorithm is one of:
a Proximal Policy Optimization algorithm;
a Soft Actor-Critic algorithm;
a Deep Deterministic Policy Gradient algorithm; and
a Twin-Delayed Deep Deterministic Policy Gradient algorithm.

15. The system of claim 10, wherein the tuning neural network and the critic neural network cooperate with each other to tune the plurality of weights during a training phase.

16. The system of claim 10, further comprising:
a multi-dimensional look-up table of stored weights operatively connected with the MPC.

17. The system of claim 16, wherein the MPC retrieves the stored weights from the multi-dimensional look-up table during a deployment phase of an operation of the automotive vehicle.

18. A trajectory tracking and tuning system for an automotive vehicle, comprising:
a trajectory planner, comprising a chipset, configured to generate a planned trajectory and to output one or more planned trajectory components representative of the planned trajectory;
a model predictive controller (MPC), comprising a chipset, configured to:
receive a predicted control input and one or more measured trajectory components from the automotive vehicle,
produce a predicted output,
utilize a cost function to receive a plurality of weights for the cost function and a predicted error to produce the predicted control input, wherein the predicted error is a sum of a selected one of the planned trajectory components minus the predicted output, and wherein the predicted control input produced by the MPC is one or more of a steering command, a throttle command and a brake command for the automotive vehicle;
a tuning neural network, comprising a chipset, configured to receive the one or more planned trajectory components and the one or more measured trajectory components and to produce the weights for the cost function; and
a critic neural network, comprising a chipset, configured to receive the one or more planned trajectory components and the one or more measured trajectory components, wherein the tuning neural network and the critic neural network cooperate with each other to tune the plurality of weights utilizing a reinforcement learning optimization algorithm seeking to minimize the cost function.

19. The trajectory tracking and tuning system of claim 18, wherein the automotive vehicle has a current position and a current speed at a current time and the trajectory planner generates a planned next position and a planned next speed for the automotive vehicle for a next time which is a predetermined time step after the current time, and wherein the one or more planned trajectory components include one or more of:
a forward component of the planned next position;
a lateral component of the planned next position; and
a magnitude of the planned next speed.

20. The trajectory tracking and tuning system of claim 18, further comprising:
a multi-dimensional look-up table of stored weights operatively connected with the MPC, wherein the MPC retrieves the stored weights from the multi-dimensional look-up table during a deployment phase of an operation of the automotive vehicle.

* * * * *